US011797762B1

(12) United States Patent
Kats

(10) Patent No.: US 11,797,762 B1
(45) Date of Patent: Oct. 24, 2023

(54) SYSTEMS AND METHODS FOR DETECTING COORDINATED PROPAGATION OF SOCIAL MEDIA CONTENT

(71) Applicant: GEN DIGITAL INC., Tempe, AZ (US)

(72) Inventor: Daniel Kats, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 199 days.

(21) Appl. No.: 17/085,660

(22) Filed: Oct. 30, 2020

Related U.S. Application Data

(60) Provisional application No. 63/063,111, filed on Aug. 7, 2020.

(51) Int. Cl.
*G06F 40/205* (2020.01)
*G06F 40/279* (2020.01)

(52) U.S. Cl.
CPC .......... *G06F 40/205* (2020.01); *G06F 40/279* (2020.01)

(58) Field of Classification Search
CPC ............................. G06F 40/205; G06F 40/279
USPC .......................................................... 704/9
See application file for complete search history.

(56) References Cited

U.S. PATENT DOCUMENTS

2021/0004583 A1* 1/2021 Evans ................. G06F 16/9014

OTHER PUBLICATIONS

Mahbub, et al. "Controlling astroturfing on the internet: a survey on detection techniques and research challenges", Int. J. Web and Grid Services, vol. 15, No. 2, 2019 (Year: 2019).*
Elmas, et al. "Lateral Astroturfing Attacks on Twitter Trending Topics." arXiv preprint arXiv:1910.07783, 2019 (Year: 2019).*
Chavoshi, et al. "DeBot: Twitter Bot Detection via Warped Correlation", Icdm, 2016 (Year: 2016).*

* cited by examiner

*Primary Examiner* — Pierre Louis Desir
*Assistant Examiner* — Nicole A K Schmieder
(74) *Attorney, Agent, or Firm* — Greenberg Traurig, LLP

(57) ABSTRACT

A computer-implemented method for detecting coordinated propagation of social media content may include calculating, by a computing device, a content similarity score for each social media post in relation to other social media posts in a set of social media posts. The method may also include identifying a related subset of social media posts based on the content similarity score. Additionally, the method may include detecting one or more clusters of social media posts in the related subset by clustering social media posts based on content similarity scores and timing. Furthermore, the method may include determining that a user account associated with a social media post in a detected cluster is in a coordinated network of user accounts. Finally, the method may include performing a security action in response to determining that the user account is in the coordinated network. Various other methods, systems, and computer-readable media are also disclosed.

20 Claims, 9 Drawing Sheets

SYSTEMS AND METHODS FOR DETECTING COORDINATED PROPAGATION OF SOCIAL MEDIA CONTENT

CROSS REFERENCE TO RELATED APPLICATION

This application claims the benefit of U.S. Provisional Application No. 63/063,111, filed 7 Aug. 2020, the disclosure of which is incorporated, in its entirety, by this reference.

BACKGROUND

Social media technologies allow users to share content or information from individual accounts. In some instances, corporations, organizations, or government entities may also create social media accounts to share relevant information or to promote advertisements. However, due to the relative anonymity of many social media platforms, coordinated networks of accounts may be used to promote specific topics under the guise of organic user interest. For example, a political group may engage in astroturfing by simultaneously posting the same political content, such as a snippet of a political ad, from multiple accounts unrelated to a political campaign to simulate grassroots activism. In other words, coordinated accounts may engage in secondary recycling of content in an attempt to obfuscate the origin of the content. In another example, an organization may use a coordinated network of sockpuppet accounts or bots as a dissemination network to promote a particular topic or advertisement to increase the likelihood of becoming a trending topic or to increase the reach of the advertisement. Because these artificial dissemination networks do not reflect the interests and posts of real users, it may be difficult to gauge the actual interest of users or the reach of legitimate advertisements. Therefore, social media platforms may want to identify and prevent these forms of coordinated accounts. Similarly, third-party organizations, such as civil society groups or regulatory agencies, may want to enforce rules for election advertising that may be violated by this type of coordination.

Traditionally, detection of falsely promoted content may rely on linguistic analyses to determine similarities between social media posts to identify the authorship of the posts. For example, linguistic analysis may attempt to identify language that is likely used by bots rather than real users. However, organically trending topics or genuine dissemination of posts may show similar patterns of content and language, making it difficult to distinguish between organic and inorganic trends. Thus, better methods of detecting coordination between user accounts is needed to identify malicious actors or misleading trends. The present disclosure, therefore, identifies and addresses a need for systems and methods for detecting coordinated propagation of social media content.

SUMMARY

As will be described in greater detail below, the present disclosure describes various systems and methods for detecting coordinated propagation of social media content. In one example, a computer-implemented method for detecting coordinated propagation of social media content may include (i) calculating, by a computing device, a content similarity score for each social media post in relation to other social media posts in a set of social media posts, (ii) identifying, by the computing device, a related subset of social media posts based on the content similarity score, (iii) detecting, by the computing device, one or more clusters of social media posts in the related subset of social media posts by clustering social media posts based on the content similarity score and a timing of each social media post, (iv) determining, by the computing device, that a user account associated with a social media post in a detected cluster is in a coordinated network of user accounts, and (v) performing a security action in response to determining that the user account is in the coordinated network of user accounts. In some examples, the content similarity score of a social media post may be weighted based on a type of the social media post.

In some embodiments, calculating the content similarity score may include extracting text from each social media post, identifying a set of keywords with a degree of uniqueness for the set of social media posts, and performing a natural language processing technique to calculate the content similarity score of the text of each social media post based on the set of keywords. In these embodiments, identifying the related subset of social media posts may include identifying social media posts within a range of content similarity scores. Additionally or alternatively, identifying the related subset of social media posts may include identifying social media posts with similar content based on the set of keywords.

In some examples, determining that the user account is in the coordinated network of user accounts may include adjusting a degree of confidence that the user account is in the coordinated network of user accounts and determining that the adjusted degree of confidence exceeds a predetermined threshold. In these examples, adjusting the degree of confidence may include calculating a likelihood that the user account is correlated to one or more other user accounts based on social media metadata and/or increasing the degree of confidence based on a prior correlation to another user account. Additionally or alternatively, adjusting the degree of confidence may include calculating a likelihood that the cluster of social media posts indicates coordination and/or increasing the degree of confidence based on a prior indication of coordination.

In one embodiment, performing the security action may include flagging the social media post, flagging the user account, and/or flagging the coordinated network of user accounts. Additionally or alternatively, the security action may include alerting an administrator about the coordinated network of user accounts and/or reducing a reach of the social media post. Furthermore, the security action may include identifying an origin of the social media post and/or performing a remedial action on the origin of the social media post.

In one example, the computer-implemented method may further include evaluating the origin of the social media post to identify another cluster of social media posts. Additionally or alternatively, the computer-implemented method may further include evaluating the origin of the social media post to identify another coordinated network of user accounts.

In one embodiment, a system for detecting coordinated propagation of social media content may include at least one physical processor and physical memory that includes computer-executable instructions that, when executed by the physical processor, cause the physical processor to execute a calculation module, an identification module, a detection module, a determination module, and a security module. In this embodiment, the system may include (i) the calculation module, stored in memory, that calculates a content similarity score for each social media post in relation to other social media posts in a set of social media posts, (ii) the identification module, stored in memory, that identifies a related subset of social media posts based on the content similarity score, (iii) the detection module, stored in memory, that detects one or more clusters of social media posts in the related subset of social media posts by clustering social media posts based on the content similarity score and a timing of each social media post, (iv) the determination module, stored in memory, that determines that a user account associated with a social media post in a cluster is in a coordinated network of user accounts, and (v) the security module, stored in memory, that performs a security action in response to determining that the user account is in the coordinated network of user accounts.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) calculate a content similarity score for each social media post in relation to other social media posts in a set of social media posts, (ii) identify a related subset of social media posts based on the content similarity score, (iii) detect one or more clusters of social media posts in the related subset of social media posts by clustering social media posts based on the content similarity score and a timing of each social media post, (iv) determine that a user account associated with a social media post in a cluster is in a coordinated network of user accounts, (v) and perform a security action in response to determining that the user account is in the coordinated network of user accounts.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
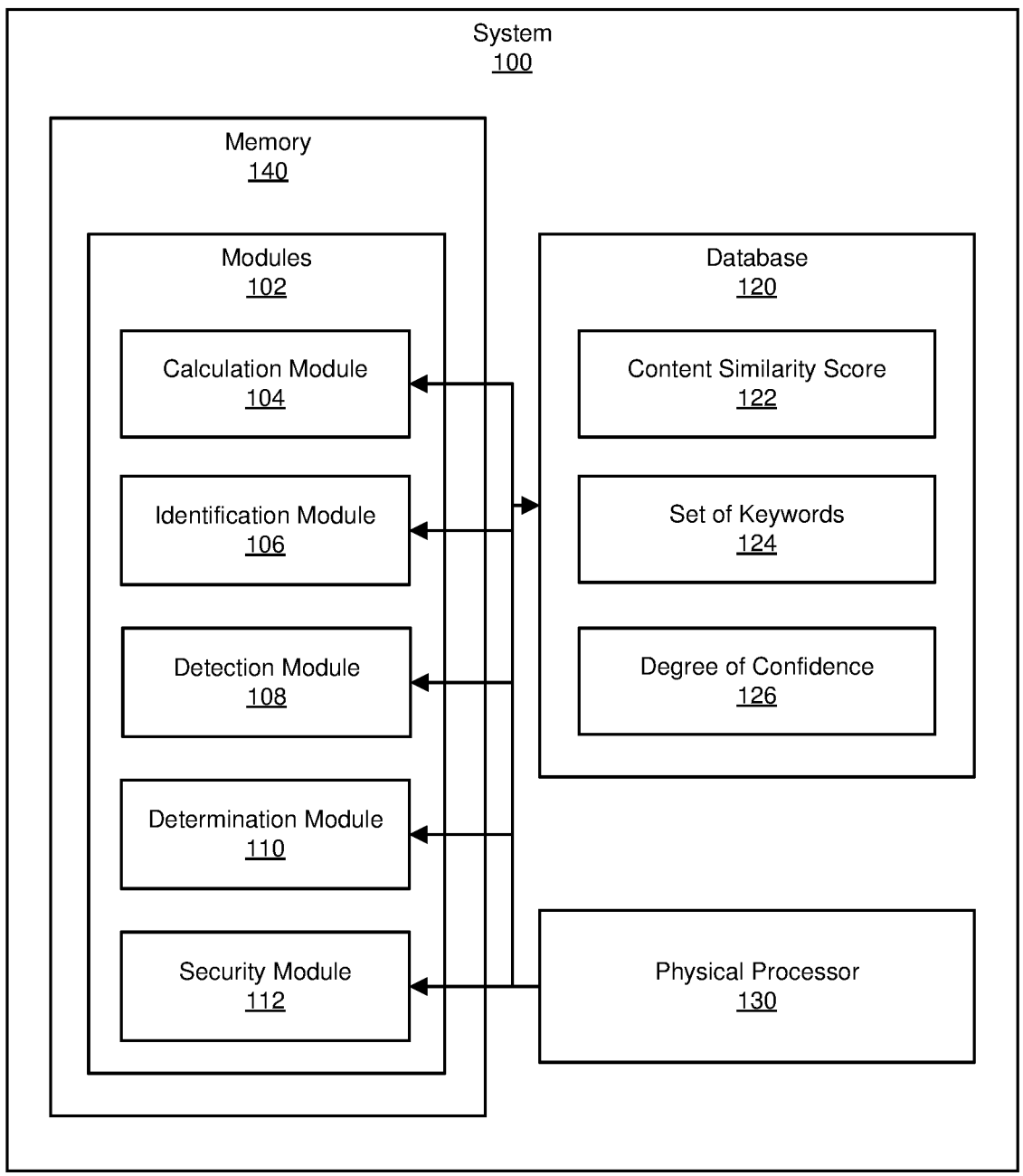
FIG. 1 is a block diagram of an example system for detecting coordinated propagation of social media content.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for detecting coordinated propagation of social media content. As will be explained in greater detail below, by observing a pattern of behavior for a group of user accounts and the timing of posts in addition to the content of posts, the systems and methods described herein may identify coordinated networks of accounts that falsely emulate organic trends. Specifically, the disclosed systems and methods may first calculate content similarity scores to identify related social media content. For example, a set of social media posts may be initially filtered using a natural language processing (NLP) technique to identify a trending topic or important keywords. Additionally, the systems and methods described herein may cluster the filtered set of social media posts based on both the content of the posts and the timing of the posts, wherein highly similar posts with close timing are more likely to be a coordinated effort. By clustering posts based on content and timing, the disclosed systems and methods may then identify coordinated networks of user accounts that may post highly similar content within a short time period. Furthermore, by tracing clustered posts backward to identify the originators of the posts, the disclosed systems and methods may evaluate the user accounts to determine whether they repeatedly exhibit coordinated behavior and build confidence in detecting coordinated networks over time.

In addition, the systems and methods described herein may improve the functioning of a computing device by performing various security actions to block certain accounts or content and/or to prevent malicious content from affecting a user account or computing device. For example, the disclosed systems and methods may identify an account takeover or unusual coordinated behavior for legitimate accounts and provide additional checks before permitting posting from the account or computing device. These systems and methods may also improve the fields of network security and/or social media moderation by flagging coordinated user accounts to prevent coordination or misuse of a social media platform. Thus, the disclosed systems and methods may improve the detection and mitigation of malicious actors on social media platforms.

Figure 2:
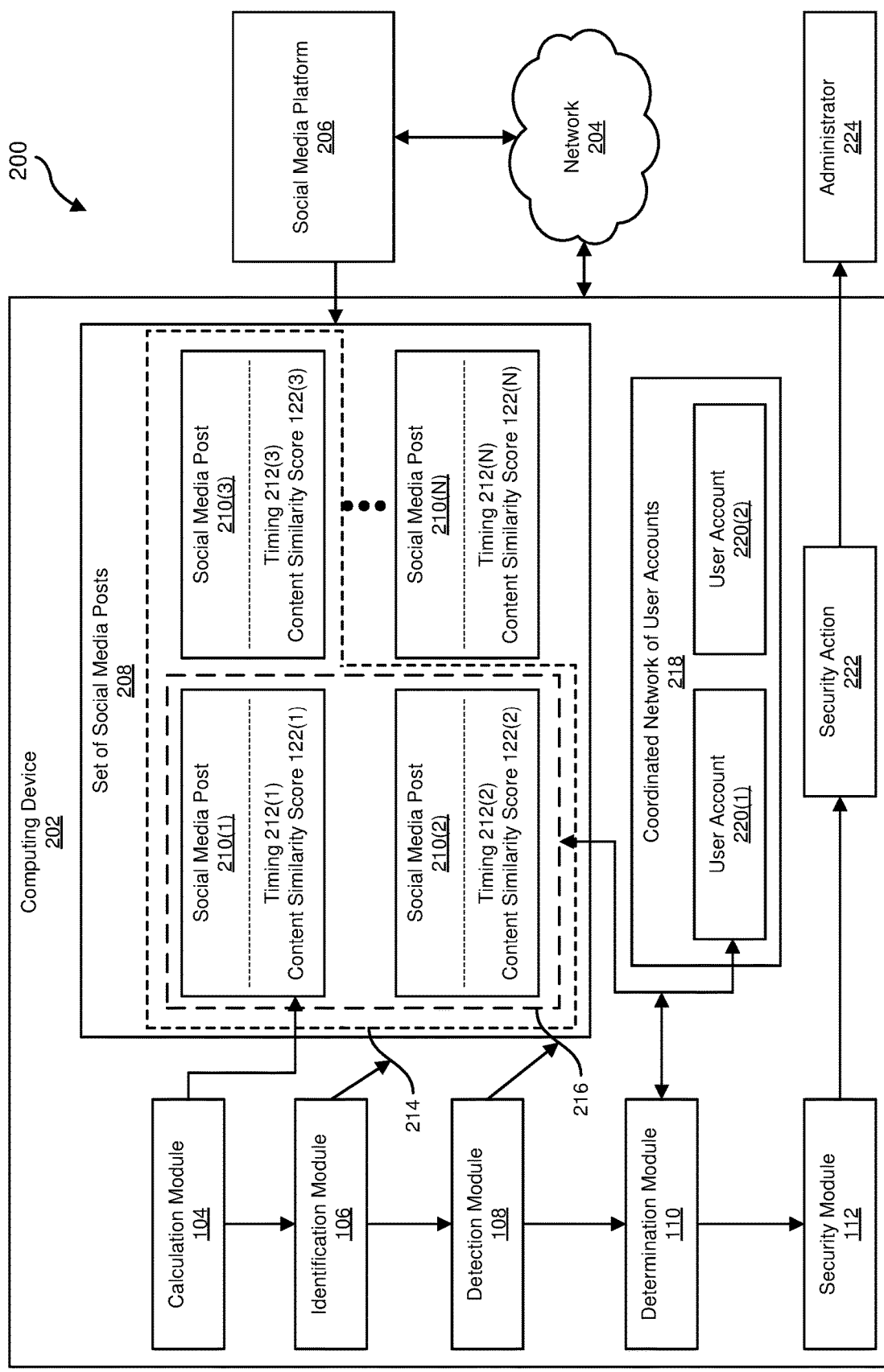
FIG. 2 is a block diagram of an additional example system for detecting coordinated propagation of social media content.

The following will provide, with reference to FIGS. 1-2, detailed descriptions of example systems for detecting coordinated propagation of social media content. Detailed descriptions of corresponding computer-implemented methods will also be provided in connection with FIG. 3. In addition, detailed descriptions of an example natural language processing technique used to calculate content similarity scores of social media posts will be provided in connection with FIG. 4. Detailed descriptions of an example clustering of social media posts based on content and timing will also be provided in connection with FIG. 5. Furthermore, detailed descriptions of an example adjustment of a degree of confidence for a coordinated network of user accounts will be provided in connection with FIG. 6. Additionally, detailed descriptions of an example trace to an origin of an example social media post will be provided in connection with FIG. 7. Finally, detailed descriptions of an example computing system and network architecture capable of implementing one or more of the embodiments described herein will be provided in connection with FIGS. 8 and 9, respectively.

FIG. 1 is a block diagram of an example system 100 for detecting coordinated propagation of social media content. As illustrated in this figure, example system 100 may include one or more modules 102 for performing one or more tasks. As will be explained in greater detail below, modules 102 may include a calculation module 104, an identification module 106, a detection module 108, a determination module 110, and a security module 112. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting coordinated propagation of social media content. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a content similarity score 122, a set of keywords 124, and/or a degree of confidence 126 that a user account is in a coordinated network of accounts. Database 120 may represent portions of a single database or computing device or a plurality of databases or computing devices. For example, database 120 may represent a portion of computing device 202 and/or social media platform 206 in FIG. 2. Alternatively, database 120 in FIG. 1 may represent one or more physically separate devices capable of being accessed by a computing device, such as computing device 202 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a social media platform 206 via a network 204. In one example, all or a portion of the functionality of modules 102 may be performed by computing device 202, social media platform 206, and/or any other suitable computing system. Similarly, social media platform 206 and computing device 202 may be merged into a single machine or computing system such that the functionality of each of modules 102 is provided within a single device or platform. For example, computing device 202 may execute all or a portion of social media platform 206.

As will be described in greater detail below, one or more of modules 102 from FIG. 1 may, when executed by at least one processor of computing device 202, enable computing device 202 to detect potentially coordinated social media posts and identify coordinated user accounts that post the coordinated content. For example, and as will be described in greater detail below, calculation module 104 may calculate content similarity scores 122(1)-(N) for each social media post 210(1)-(N) in relation to other social media posts in a set of social media posts 208. Identification module 106 may identify a related subset 214 of social media posts based on content similarity scores 122(1)-(N). Detection module 108 may then detect a cluster 216 of social media posts in related subset 214 by clustering social media posts 210(1)-(N) based on content similarity scores 122(1)-(N) and timing 212(1)-(N) of each social media post. Determination module 110 may determine that a user account 220(1) and a user account 220(2) associated with social media post 210(1) and social media post 210(2) in cluster 216 is in a coordinated network of user accounts 218. Security module 112 may perform a security action 222 in response to determining that user accounts 220(1) and 220(2) are in coordinated network of user accounts 218.

In the example of FIG. 2, and as will be explained in greater detail below, computing device 202 may first collect set of social media posts 208 from social media platform 206. As used herein, the term "social media post" generally refers to a discrete message posted by a social media user account to a social media platform or website that may contain text, images, videos, and/or other digital content. For example, social media posts 210(1)-(N) may represent digital content uploaded and/or posted by a single user or multiple user accounts. Computing device 202 may then compare and contrast the content of social media posts 210(1)-(N) to calculate a content similarity score for each individual post. The term "content similarity score," as used herein, generally refers to a metric for evaluating comparative similarity between social media posts.

In the above example, computing device 202 may use content similarity scores 122(1)-(N) to identify initial related subset 214 containing social media posts 210(1)-(3). Computing device 202 may then further evaluate related subset 214 using timing 212(1)-(3) in addition to content similarity score 122(1)-(3) to perform a clustering technique and identify cluster 216 containing social media posts 210(1) and 210(2). The term "clustering," as used herein, generally refers to a method of analyzing and grouping similar data and/or related objects to distinguish it from less similar data. Examples of clustering may include, without limitation, k-nearest neighbors (k-NN) algorithms, k-means clustering, expectation-maximization algorithms, hierarchical clustering, and/or any other suitable method. In this example, cluster 216 may represent a group of social media posts with a high likelihood of coordination.

Furthermore, computing device 202 may determine that user account 220(1) posted social media post 210(1) and user account 220(2) posted social media post 210(2). In this example, computing device 202 may identify coordinated network of user accounts 218 containing user accounts 220(1) and 220(2) based on the high likelihood of coordination between social media posts 210(1) and 210(2). Finally, computing device 202 may perform security action 222 by alerting an administrator 224 about coordinated network of user accounts 218 and/or cluster 216.

Computing device 202 generally represents any type or form of computing device capable of reading computer-executable instructions. For example, computing device 202 may represent an administrative device that monitors social media platform 206 for potential threats to social media platform 206 and/or to user accounts. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Social media platform 206 generally represents any type or form of web-based platform, such as a website accessible to individual user devices over network 204. Although illustrated as a single entity in FIG. 2, social media platform 206 may include and/or represent a plurality of computing devices and/or servers, such as computing device 202, that work and/or operate in conjunction with one another to provide a comprehensive networked platform.

Network 204 generally represents any medium or architecture capable of facilitating communication or data transfer. In one example, network 204 may facilitate communication between computing device 202 and social media platform 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
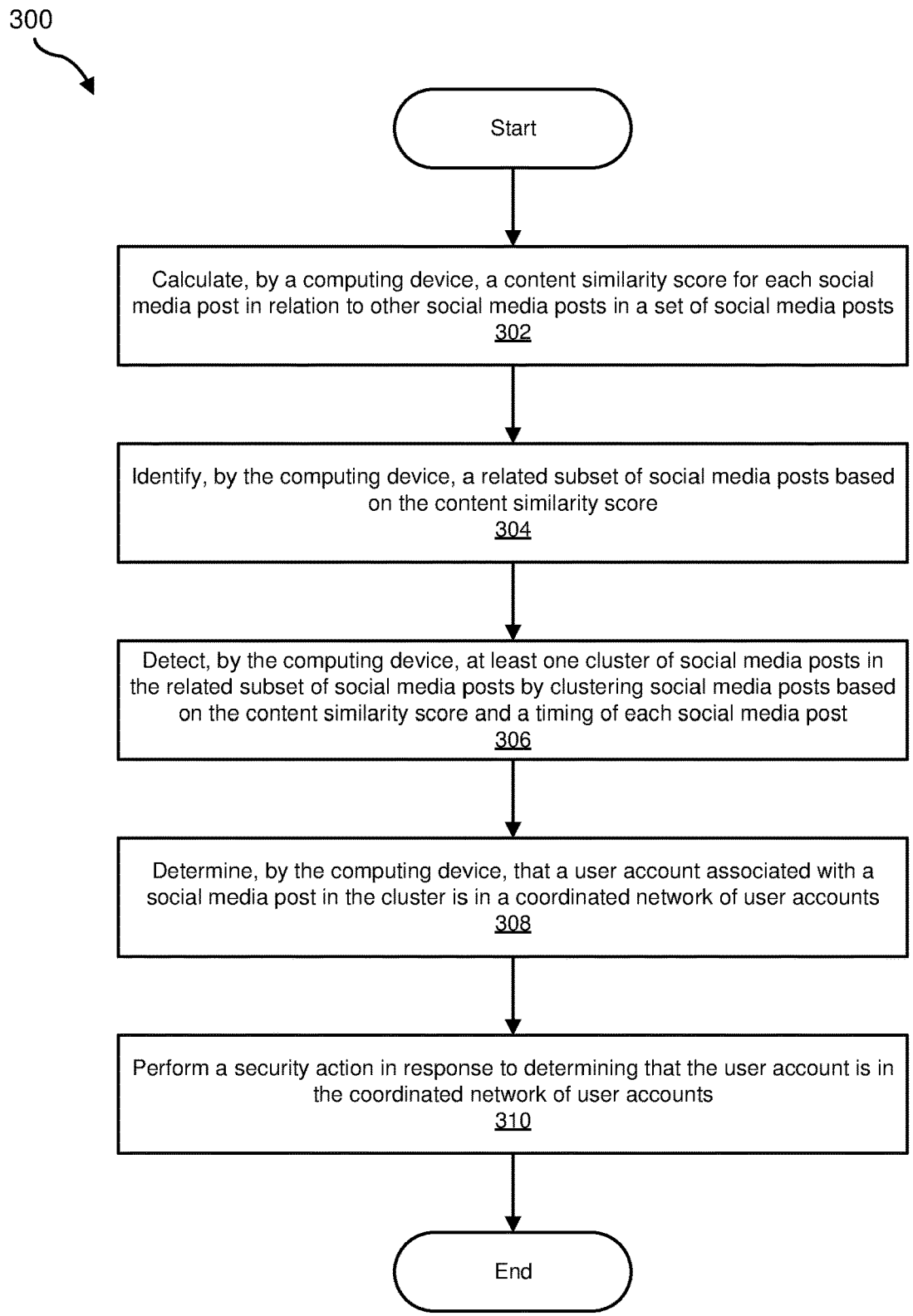
FIG. 3 is a flow diagram of an example method for detecting coordinated propagation of social media content.

FIG. 3 is a flow diagram of an example computer-implemented method 300 for detecting coordinated propagation of social media content. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple substeps, examples of which will be provided in greater detail below.

As illustrated in FIG. 3, at step 302 one or more of the systems described herein may calculate a content similarity score for each social media post in relation to other social media posts in a set of social media posts. For example, calculation module 104 may, as part of computing device 202 in FIG. 2, calculate content similarity scores 122(1)-(N) for social media posts 210(1)-(N) in relation to each other in set of social media posts 208.

The systems described herein may perform step 302 in a variety of ways. In one example, set of social media posts 208 may include posts from individual user accounts and/or advertising or promoted posts. Calculation module 104 may then calculate content similarity scores to extract text and identify unique terms to identify a set of social media posts that contain similar terms. In one embodiment, content similarity scores 122(1)-(N) may be weighted based on a type of each of social media posts 210(1)-(N). For example, original posts by a user account may be weighted differently from posts that involve sharing content from other users, which may include the exact same content or text. In this example, original posts may provide more useful evidence of traditional methods of astroturfing while shared posts may be useful for amplification purposes.

In some examples, calculation module 104 may calculate content similarity scores 122(1)-(N) by extracting text from each social media post, identifying a set of keywords with a degree of uniqueness for set of social media posts 208, and performing a natural language processing technique to calculate the content similarity score of the text of each social media post based on the set of keywords. As used herein, the terms "natural language processing" and "NLP" generally refer to a data mining process performed on textual data that analyzes patterns in the text or extracts meaning from the text. For example, one NLP technique may weight social media posts using a term frequency-inverse document frequency (TF-IDF) method such that a frequency of a term within a social media post is counterbalanced by the frequency of the term across all social media posts, thereby identifying unique and related posts. In some examples, the set of keywords may represent unique or relevant words that may boost trending posts or topics on social media platform 206.

Figure 4:
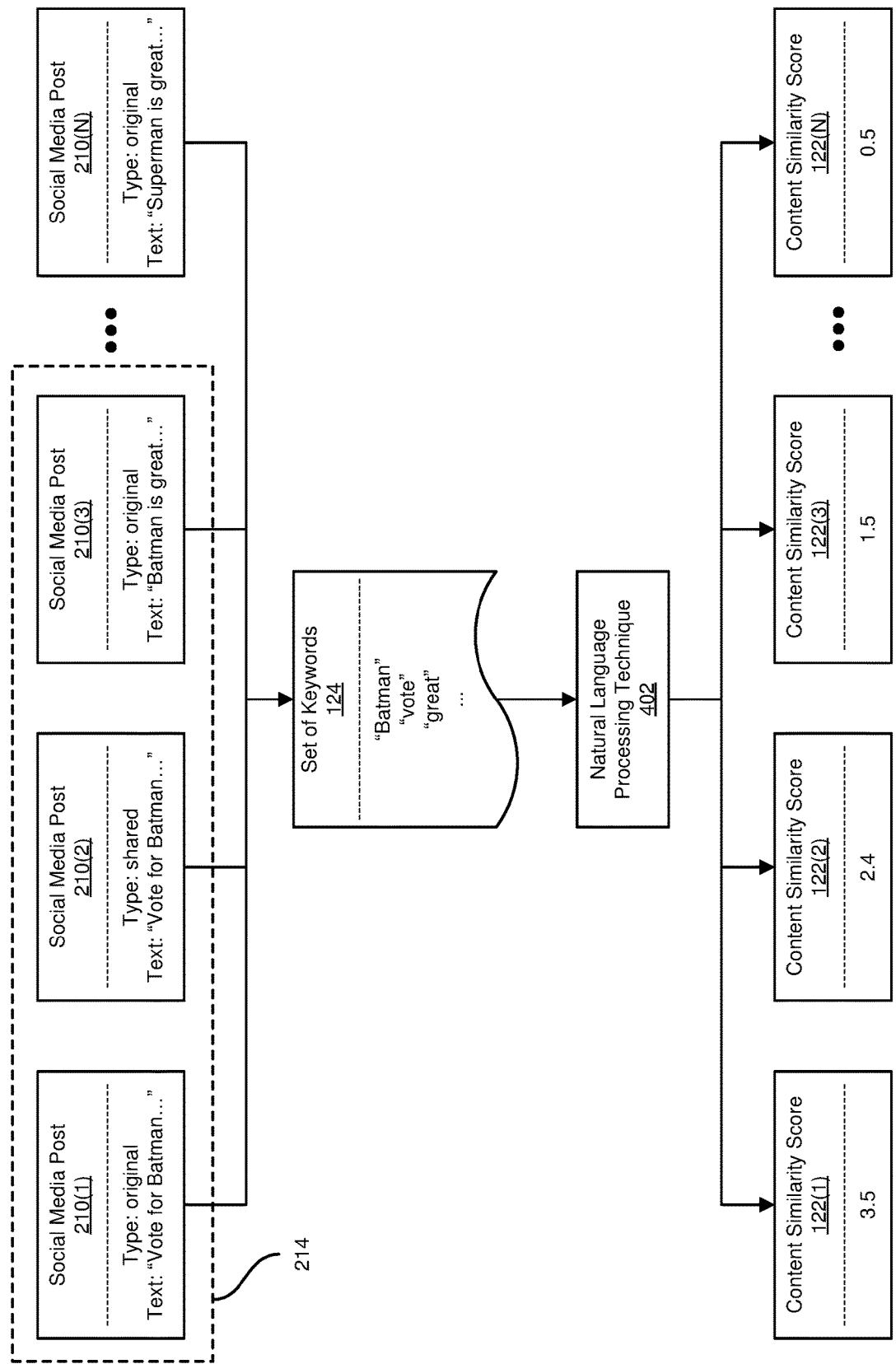
FIG. 4 is a block diagram of an example natural language processing technique used to calculate example content similarity scores of social media posts.

For example, as illustrated in FIG. 4, set of keywords 124 may be extracted from the text of social media posts 210(1)-(N) and used in a natural language processing technique 402. In this example, natural language processing technique 402 may represent a TF-IDF method that calculates content similarity scores 122(1)-(N) by evaluating the uniqueness of set of keywords 124 and the occurrence of different keywords in each social media post. For example, the keyword "vote" may represent a more unique or relevant keyword than the keyword "great" and, therefore, contribute to higher content similarity scores 122(1) and 122(2) for social media posts 210(1) and 210(2) that contain the keyword "vote" than content similarity score 122(3) for social media post 210(3). Additionally, natural language processing technique 402 may weight each of content similarity scores 122(1)-(N) based on the type of each of social media posts 210(1)-(N). For example, social media post 210(2) may include the same text as social media post 210(1) due to being a shared version of social media post 210(1) rather than an original post. Thus, content similarity score 122(2) for social media post 210(2) may be a lower score than content similarity score 122(1) for social media post 210(1). Furthermore, content similarity scores 122(3) and 122(N) may represent lower scores due to social media posts 210(3) and 210(N) containing fewer words from set of keywords 124.

Returning to FIG. 3, at step 304 one or more of the systems described herein may identify a related subset of social media posts based on the content similarity score. For example, identification module 106 may, as part of computing device 202 in FIG. 2, identify related subset 214 of social media posts based on content similarity scores 122(1)-(N).

The systems described herein may perform step 304 in a variety of ways. In some embodiments, identification module 106 may identify related subset 214 of social media posts by identifying social media posts within a range of content similarity scores. Additionally or alternatively, identification module 106 may identify social media posts with similar content based on set of keywords 124.

In the example of FIG. 4, identification module 106 may identify social media posts 210(1) and 210(2) as highly related posts due to relatively high content similarity scores 122(1) and 122(2). In this example, social media post 210(3) may also be considered related to social media posts 210(1) and 210(2) based on content similarity score 122(3), which may be higher than a required threshold score to be included in related subset 214. Additionally, identification module 106 may determine low content similarity score 122(N) indicates social media post 210(N) does not belong in related subset 214.

In the above example, related subset 214 may represent a first step to filter out likely unrelated posts from among set of social media posts 208 prior to identifying coordinated behavior. In some examples, specific posts, such as advertisements, may be collected and evaluated to extract text and identify unique keywords, and a set of related social media posts that contain similar keywords may be subsequently identified. For example, the disclosed systems may initially identify an advertisement and focus on keywords present in the advertisement to identify additional related posts. Alternatively, viral posts or trending topics may be first identified using related subset 214 and subsequently correlated to an advertisement or similar promoted posts by evaluating set of keywords 124.

Returning to FIG. 3, at step 306 one or more of the systems described herein may detect one or more clusters of social media posts in the related subset of social media posts by clustering social media posts based on the content similarity score and a timing of each social media post. For example, detection module 108 may, as part of computing device 202 in FIG. 2, detect cluster 216 of social media posts in related subset 214 of social media posts by clustering social media posts 210(1)-(3) based on content similarity scores 122(1)-(3) and timing 212(1)-(3).

The systems described herein may perform step 306 in a variety of ways. In some examples, detection module 108 may perform temporal clustering to cluster social media posts based on the time at which each post was created in addition to clustering social media posts based on similar text as indicated by content similarity scores. By evaluating posts both linguistically and temporally, the clustering may distinguish between coordinated and uncoordinated user accounts. For example, a network of user accounts that post the same information at the same time is likely to be coordinating the posts. On the other hand, user accounts that post similar content at a staggered rate or content that varies within a short timespan are likely to be uncoordinated accounts. In other words, coordination such as astroturfing generally has less time delay and more consistent messaging than organic or grassroots content, particularly due to the loss of virality if coordinated social media posts are not in lockstep.

Figure 5:
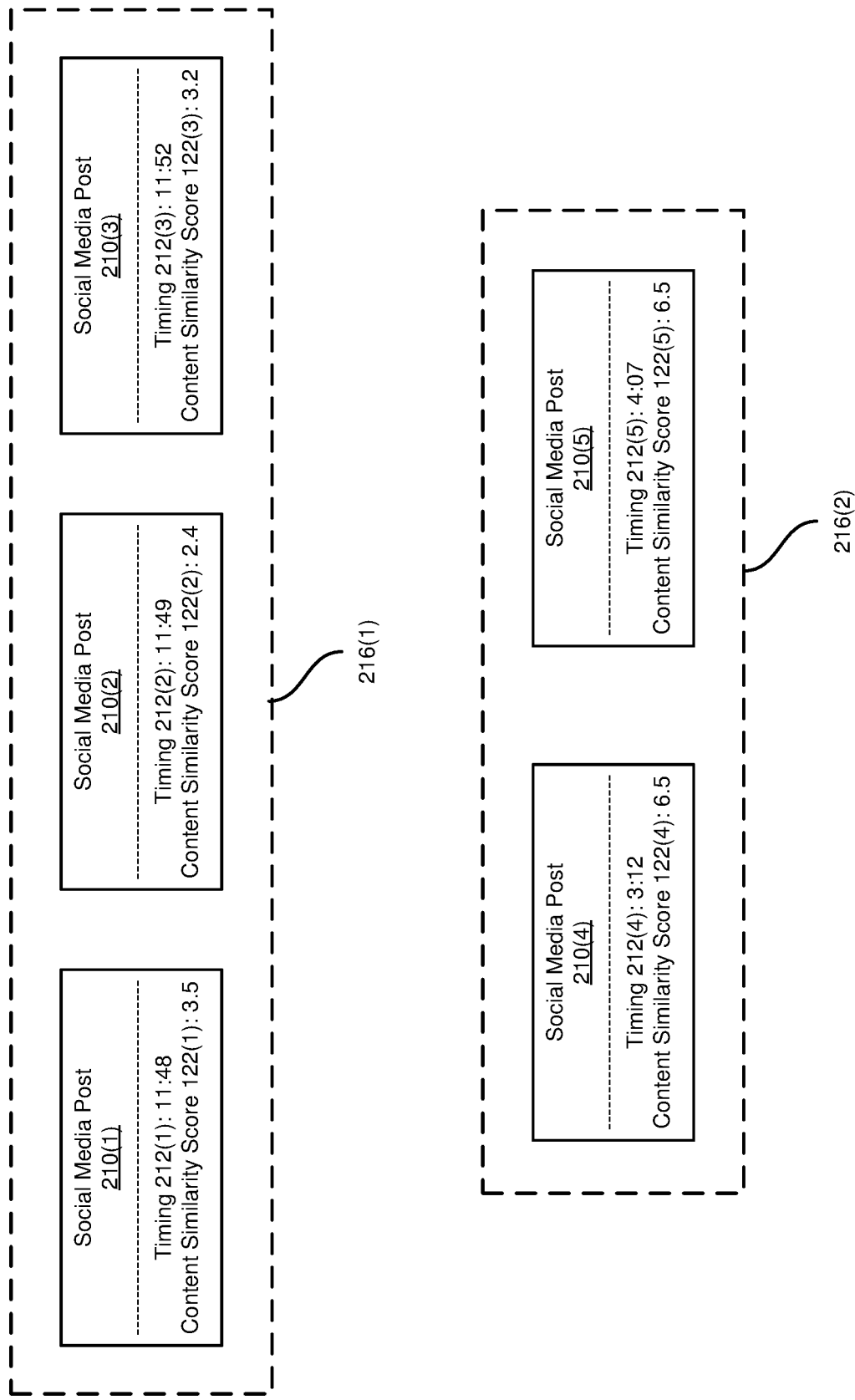
FIG. 5 is a block diagram of an example clustering of example social media posts based on the content and the timing of the posts.

As illustrated in FIG. 5, detection module 108 may cluster social media posts 210(1)-(3) into a cluster 216(1) and social media posts 210(4) and 210(5) into a second cluster 216(2). In this example, social media posts 210(1)-(3) may contain somewhat similar content, based on content similarity scores 122(1)-(3), that are posted around the same time, based on timing 212(1)-(3). Due to the closeness of timing 212(1)-(3), detection module 108 may cluster social media posts 210(1)-(3) into cluster 216(1) as potentially indicating coordination. Additionally, social media posts 210(4) and 210(5) may contain highly similar content, based on relatively high and equivalent content similarity scores 122(4) and 122(5). Due to the high content similarity, social media posts 210(4) and 210(5) may be clustered into cluster 216(2) despite timing 212(4) and timing 212(5) being relatively further apart.

Returning to FIG. 3, at step 308 one or more of the systems described herein may determine that a user account associated with a social media post in the cluster is in a coordinated network of user accounts. For example, determination module 110 may, as part of computing device 202 in FIG. 2, determine that user accounts 220(1) and 220(2) associated with social media posts 210(1) and 210(2), respectively, in cluster 216 are in coordinated network of user accounts 218.

The systems described herein may perform step 308 in a variety of ways. In one embodiment, users may post social media posts from individual devices to social media platform 206, and each social media post in set of social media posts 208 may be attributed to a single user account. In some embodiments, determination module 110 may determine that user account 220(1) is in coordinated network of user accounts 218 by adjusting a degree of confidence that user account 220(1) is in coordinated network of user accounts 218 and determining that the adjusted degree of confidence exceeds a predetermined threshold. In these embodiments, determination module 110 may similarly determine that user account 220(2) is in coordinated network of user accounts 218 and/or determine that user accounts 220(1) and 220(2) may coordinate social media posts 210(1) and 210(2), thereby grouping user accounts 220(1) and 220(2) into a coordinated network.

In some embodiments, determination module 110 may adjust the degree of confidence by calculating a likelihood that user account 220(1) is correlated to user account 220(2) based on social media metadata and increasing the degree of confidence based on a prior correlation to user account 220(2). For example, social media metadata may include data indicating user accounts 220(1) and 220(2) use the same computing device and/or the same network connection to post on social media platform 206, which may indicate a single user or organization utilizing user accounts 220(1) and 220(2). Additionally or alternatively, determination module 110 may calculate a likelihood that cluster 216 of social media posts indicates coordination and increase the degree of confidence based on a prior indication of coordination from user accounts 220(1) and 220(2). In these embodiments, determination module 110 may group user accounts based on temporal coordination and evaluate whether the group of user accounts is likely to be working in tandem. Additionally, the degree of confidence may increase or decrease over time as new data and social media posts indicate more or less coordination between user accounts.

Figure 6:
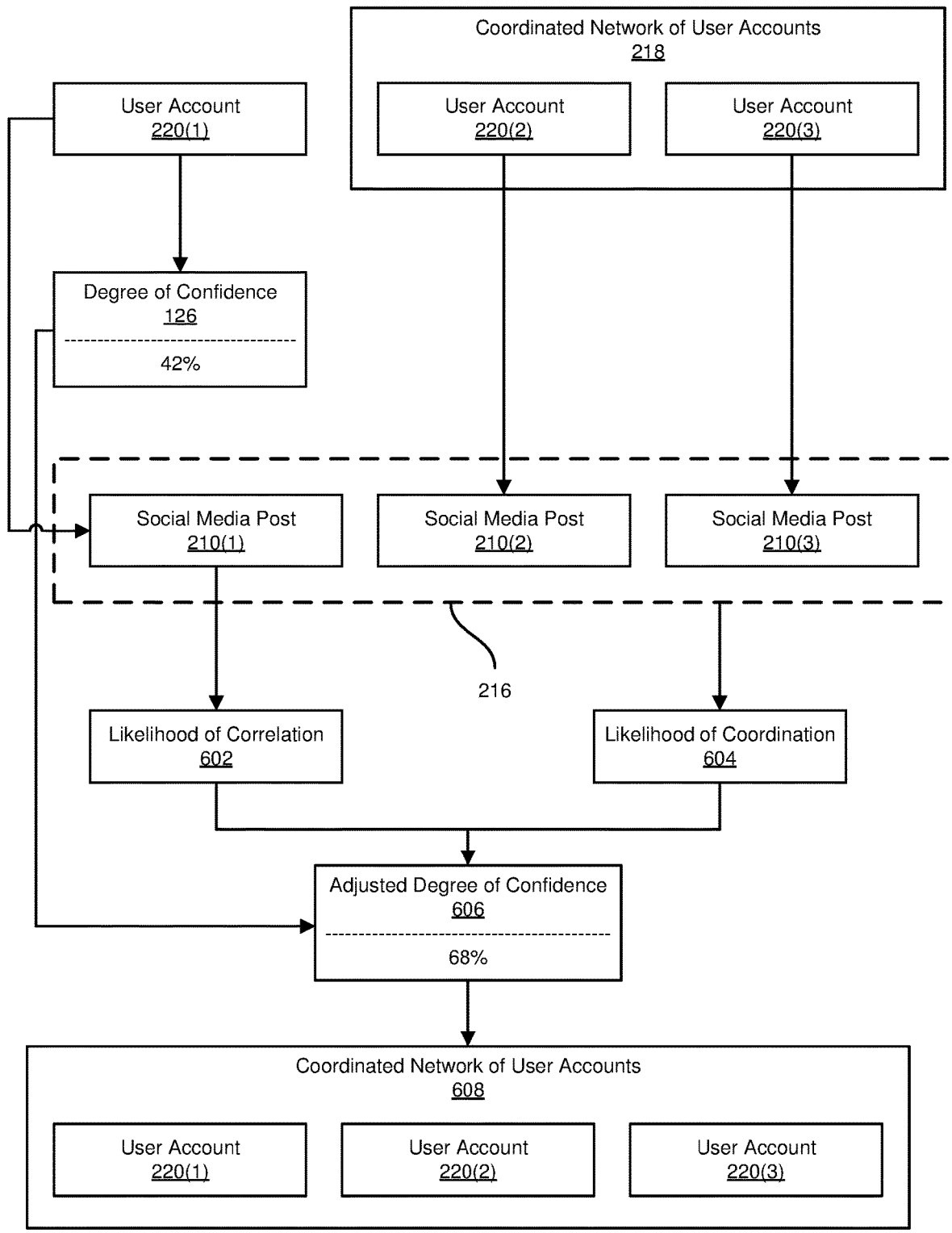
FIG. 6 is a block diagram of an example adjustment of a degree of confidence for an example coordinated network of user accounts.

As illustrated in the example of FIG. 6, user account 220(1) may have an initial degree of confidence 126 of 42%, which may be below a predetermined threshold to be considered part of coordinated network of user accounts 218. In contrast, user accounts 220(2) and 220(3) may have higher degrees of confidence or may be previously determined to be part of coordinated network of user accounts 218. In this example, user account 220(1) may then post social media post 210(1), which may be evaluated to be part of cluster 216 along with social media posts 210(2) and 210(3) associated with user accounts 220(2) and 220(3). Determination module 110 may then calculate a likelihood of correlation 602 that indicates user account 220(1) is correlated to user account 220(2) and/or user account 220(3) based on social media metadata for social media post 210(1). Additionally, determination module 110 may calculate a likelihood of coordination 604 based on cluster 216 indicating potential coordination of social media posts 210(1)-(3). Determination module 110 may then adjust degree of confidence 126 using likelihood of correlation 602 and likelihood of coordination 604 to calculate an adjusted degree of confidence 606. In this example, adjusted degree of confidence 606 may increase to 68%, which may exceed the predetermined threshold. Thus, a coordinated network of user accounts 608 may include user account 220(1) in addition to user accounts 220(2) and 220(3) based on newly adjusted degree of confidence 606.

In some embodiments, multiple social media posts may be attributed to a single user account. For example, social media posts 210(1) and 210(2) may both be posted by user account 220(1). In this example, detection module 108 may cluster social media post 210(2) with social media post 210(3) in cluster 216 while social media post 210(1) may not be part of a cluster. Determination module 110 may then calculate a lower degree of confidence for user account 220(1) based on lower likelihood of correlation 602 due to social media post 210(1) indicating a low likelihood of user account 220(1) coordinating with other user accounts. In another example, social media post 210(1) may contain metadata indicating a low likelihood of user account 220(1) coordinating with other user accounts. In this example, determination module 110 may evaluate the metadata of social media posts in addition to the content to determine the structure of coordinated network of user accounts 608 and how information percolates through the network.

In the above examples, determination module 110 may evaluate and adjust coordinated network of user accounts 608 over time. Because bots or sockpuppet accounts may be expensive or time-consuming to create, such coordinated user networks may likely continue coordinated behavior over time and may be continually observed to build confidence in the detection of coordination. The disclosed systems may calculate a degree of confidence that a user account is associated with a coordinated network based on one incident or one social media post. However, if the degree of confidence is low or the user account is not clustered with the coordinated network, the disclosed systems may continue to track the user account and identify future posts that also indicate coordination, which may then increase the degree of confidence with each separate incidence until it meets a threshold. In other words, an account that exhibits coordination through multiple iterations has a higher likelihood of being part of a coordinated network of user accounts than a single dissemination event. In the example of FIG. 6, user account 220(1) may initially be evaluate using previous social media posts to be outside coordinated network of user accounts 218, despite some indicate of coordination. The addition of social media post 210(1) may indicate further coordination that pushes adjusted degree of confidence 606 over a predetermined threshold, and user account 220(1) may then be determined to be part of coordinated network of user accounts 608 after posting social media post 210(1).

Returning to FIG. 3, at step 310 one or more of the systems described herein may perform a security action in response to determining that the user account is in the coordinated network of user accounts. For example, security module 112 may, as part of computing device 202 in FIG. 2, perform security action 222 in response to determining that user account 220(1) is in coordinated network of user accounts 218.

The systems described herein may perform step 310 in a variety of ways. In some embodiments, security module 112 may perform security action 222 by flagging social media post 210(1), flagging user account 220(1), and/or flagging coordinated network of user accounts 218. In the example of FIG. 2, security module 112 may alert administrator 224 about coordinated network of user accounts 218. For example, administrator 224 may monitor social media platform 206 using computing device 202 and/or a separate computing device, and computing device 202 may send alerts to administrator 224 about irregular or coordinated behavior. In some embodiments, security module 112 may also attempt to reduce a reach of social media post 210(1), such as by restricting user access to social media post 210(1), blocking an action of user account 220(1), providing a visual indicator of flagged social media posts and/or user accounts to alert other users, and/or adjusting an algorithm to reduce promotion of social media post 210(1) to other users.

In one embodiment, security module 112 may also identify an origin of social media post 210(1) and/or perform a remedial action on the origin of social media post 210(1). In this embodiment, the systems and methods disclosed above may evaluate the origin of social media post 210(1) to identify another cluster of social media posts and/or another coordinated network of user accounts.

Figure 7:
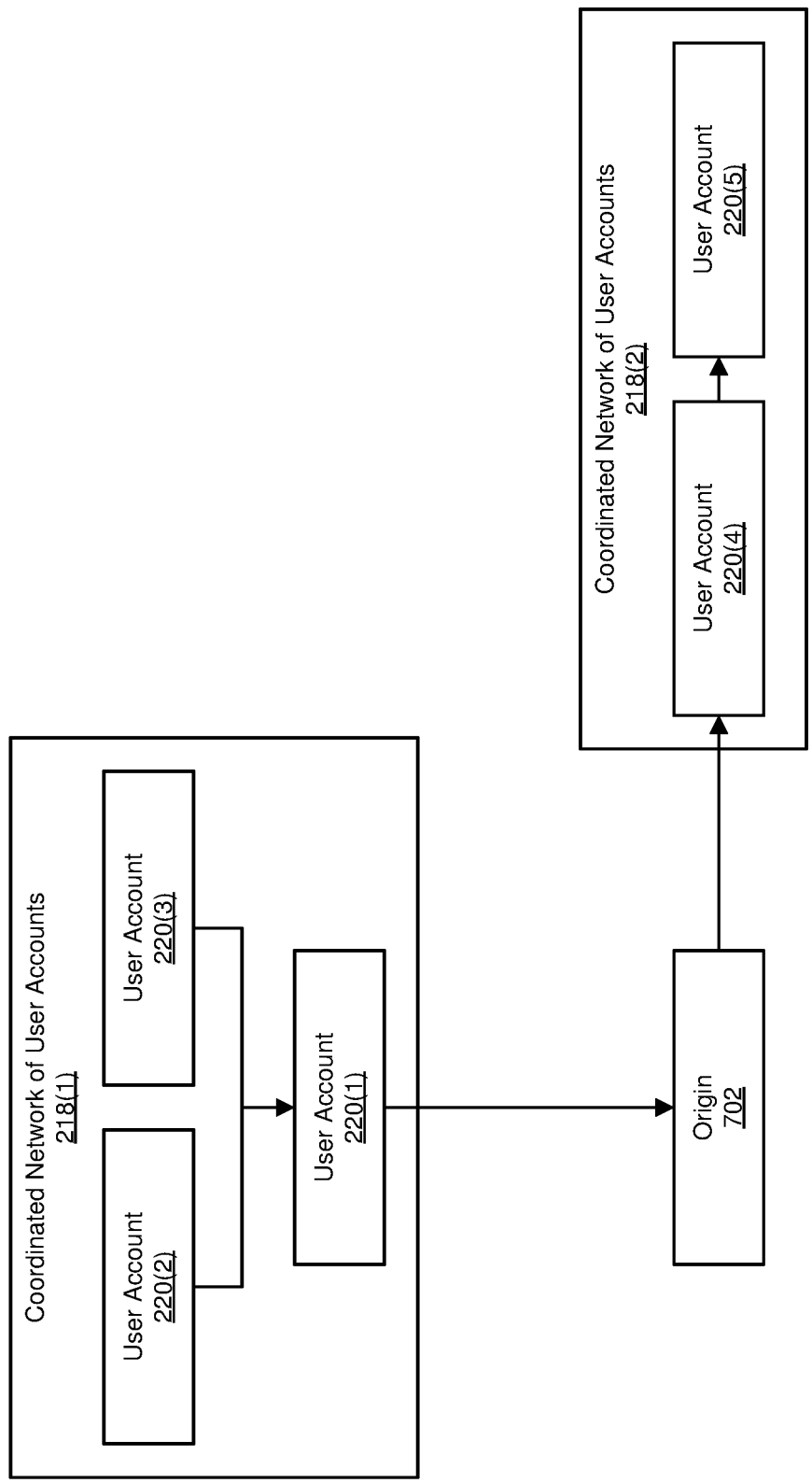
FIG. 7 is a block diagram of an example trace to an origin of an example social media post.

As illustrated in FIG. 7, a coordinated network of user accounts 218(1) may include user accounts 220(1)-(3). Security module 112 may determine that social media posts by user accounts 220(2) and 220(3) appear to copy and/or chronologically follow posts by user account 220(1), and social media posts by user account 220(1) may appear to copy and/or chronologically follow an origin 702, which may represent another user account, an organization, an advertising account, another type of account, and/or an entity from another website. For example, an individual social media post may replicate all or a portion of an advertisement, which may be sourced from a different social media platform. By tracing posts and connections back to find the originator or source of social media content, security module 112 may also evaluate the origin 702 to determine if it often originates other content as well. In this example, security module 112 may then identify other coordinated networks of user accounts, such as a coordinated network of user accounts 218(2) including user accounts 220(4) and 220(5), that may also disseminate content from origin 702.

In another embodiment, the disclosed systems and methods may first identify viral posts and trends, and security module 112 may identify potential origins of the trends to further identify dissemination networks. By identifying the origins and further identifying coordinated networks of user accounts, security module 112 may flag accounts as potential malicious actors and may pose restrictions on accounts originating the content. For example, a social media platform may ban organizations that attempt to coordinate the dissemination of advertising content. Additionally, the disclosed systems and methods may identify and mediate other forms of coordinated posting, such as information amplification or account takeovers, based on how information propagates through a coordinated network of accounts. For example, security module 112 may reduce the reach of false political information created by organizations or political entities. As another example, security module 112 may identify malicious account takeovers or hacked user accounts based on coordinated posting behavior that appears contrary to previous legitimate user behavior and/or prevent potential malware linked to hacked accounts. Thus, the disclosed systems and methods may protect both user accounts and user devices.

The disclosed systems and methods may also use an application programming interface (API) of a single or multiple social media platforms to provide solutions for a single platform or to identify cross-posting between platforms. For example, the disclosed methods may provide a security application to social media platforms, social network administration, or other interested individuals or organizations that may want to regulate or monitor coordinated behavior. In this example, the security application may monitor multiple platforms and/or websites to identify potential coordination across platforms and provide mediation methods for each specific social media platform.

As explained above in connection with method 300 in FIG. 3, the disclosed systems and methods may, by determining a network structure of user accounts and tracing how information is disseminated through a social media network, improve the identification of coordinated user behavior and inorganic trends on social media platforms. Specifically, the disclosed systems and methods may use natural language processing techniques to compare the content of social media posts and calculate similarity scores for each social media post. By clustering social media posts based on both the timing of the posts and the content similarity scores, the systems and methods described herein may then identify clusters of related posts that may be coordinated. By examiner other factors such as the metadata associated with social media posts and user accounts, the disclosed systems and methods may also determine whether posts are likely to result from coordinated behavior or organic sharing of information. Additionally, the systems and methods described herein may observe user accounts over time to improve the confidence that a user account may be associated with a coordinated network of user accounts. For example, by observing social media posts through multiple iterations over time rather than a single dissemination event, the disclosed systems and methods may identify groups of user accounts likely to continually share the same posts or information. Thus, the systems and methods described herein may more accurately identify coordination while monitoring social media platforms and more accurately implement mediation to prevent further coordination.

Figure 8:
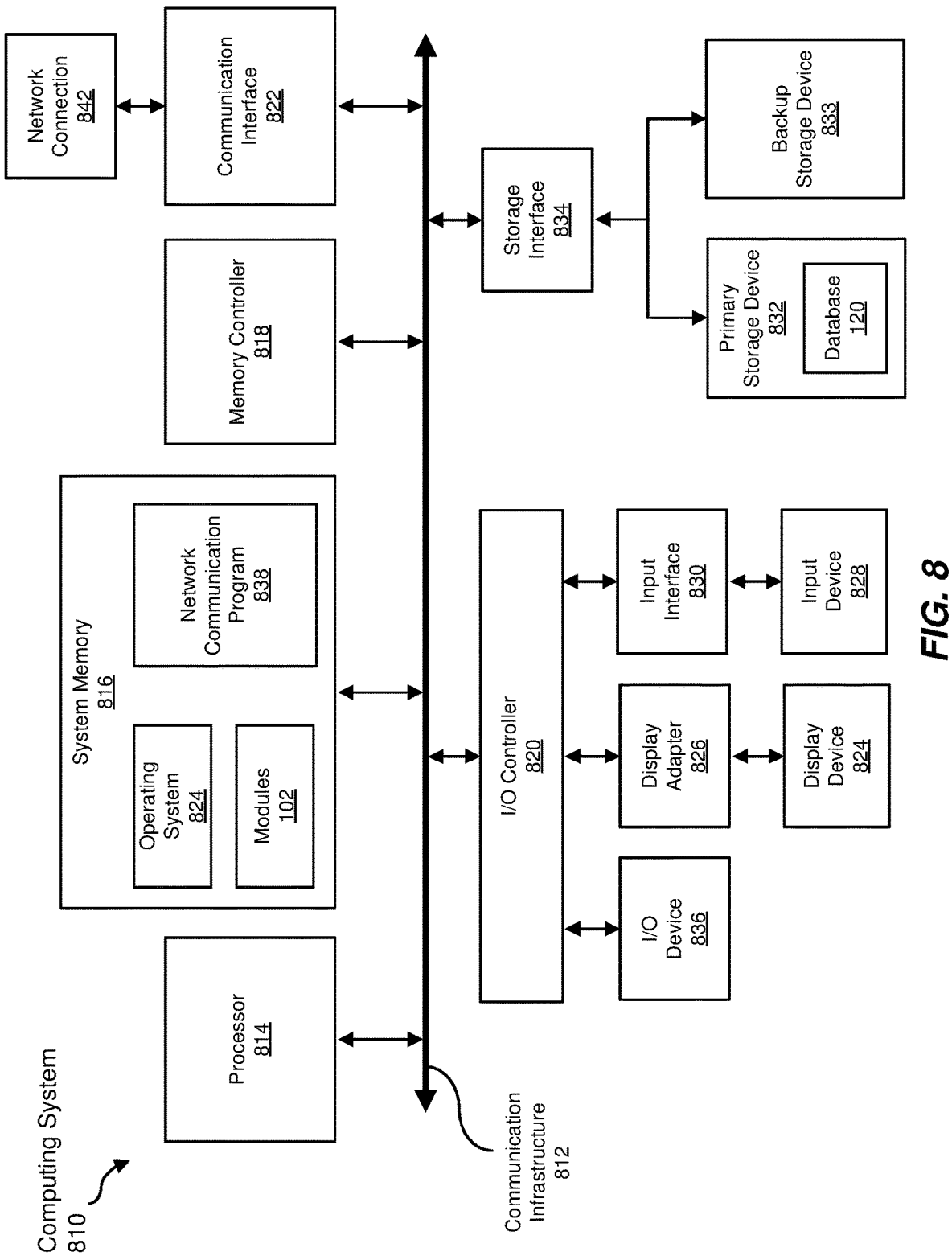
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 824 for execution by processor 814. In one example, operating system 824 may include and/or represent software that manages computer hardware and software resources and/or provides common services to computer programs and/or applications on computing system 810. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application-Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
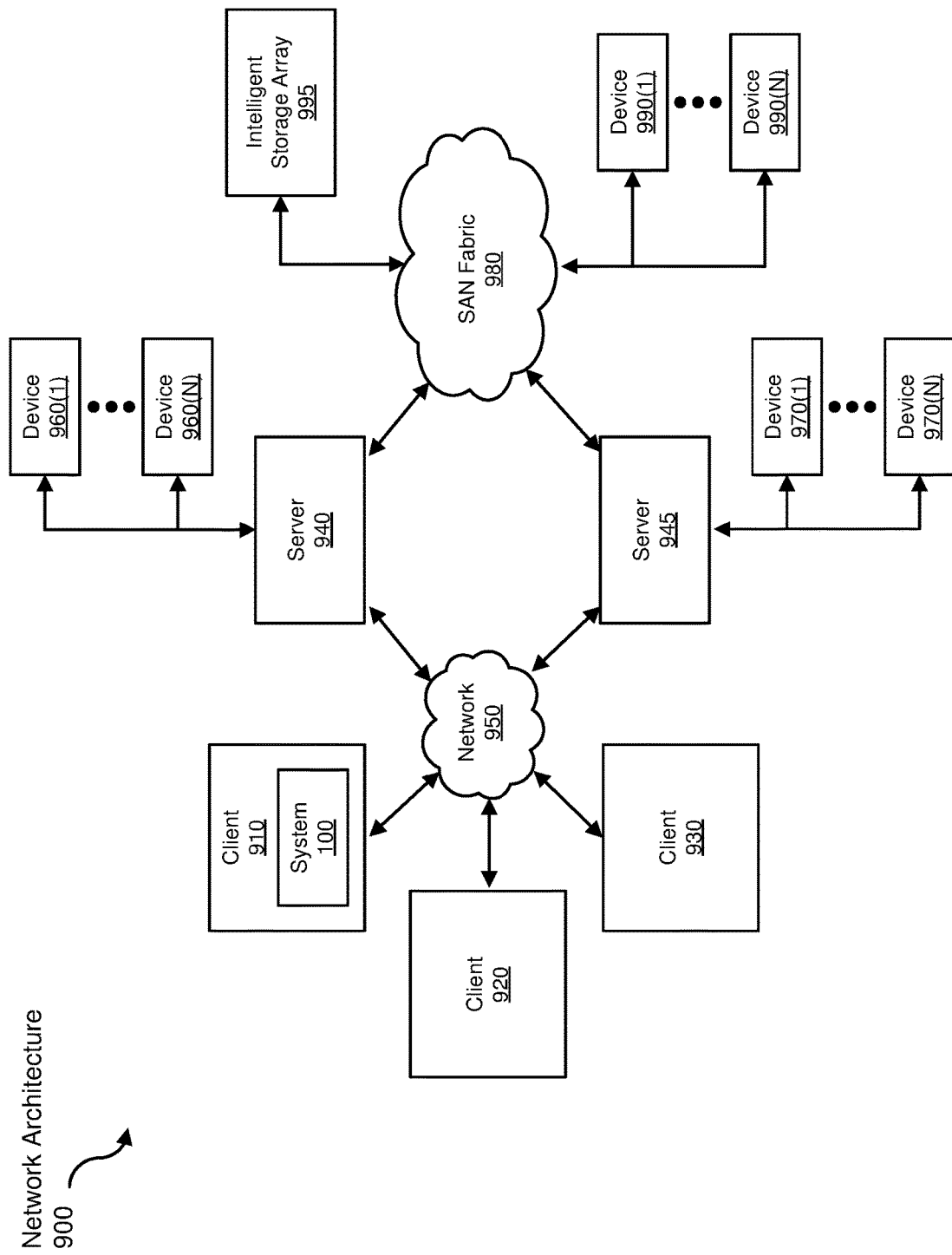
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for detecting coordinated propagation of social media content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive social media posts to be transformed, transform the social media posts to clusters of related posts, output a result of the transformation to a storage or output device, use the result of the transformation to identify coordinated networks of user accounts, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting coordinated propagation of social media content, at least a portion of the method being performed by a computing device comprising at least one processor, the method comprising:
   calculating, by the computing device using a natural language processing technique through data mining, a content similarity score for each social media post in relation to other social media posts in a set of social media posts;
   identifying, by the computing device, a related subset of social media posts based on the content similarity score;
   detecting, by the computing device, at least one cluster of social media posts in the related subset of social media posts by clustering social media posts based on the content similarity score and a timing of each social media post;
   determining, by the computing device, that a user account associated with a social media post in the cluster of social media posts is in a coordinated network of user accounts based on:
      determining the cluster of social media posts is associated with the coordinated network of user accounts; and
      increasing a degree of confidence that the user account is in the coordinated network of user accounts from a prior dissemination event indicating the user account is in the coordinated network of user accounts;
   identifying, by the computing device, an origin of the social media post in the cluster of social media posts by chronologically tracing the cluster of social media posts backward through the coordinated network of user accounts to the origin, wherein the origin comprises an entity that disseminates content to the coordinated network of user accounts; and
   performing a security action to mitigate malicious content on the computing device in response to determining that the user account is in the coordinated network of user accounts and identifying the origin of the social media post.

2. The computer-implemented method of claim 1, wherein the content similarity score is weighted based on a type of the social media post.

3. The computer-implemented method of claim 1, wherein calculating the content similarity score comprises:
   extracting text from each social media post;
   identifying a set of keywords with a degree of uniqueness for the set of social media posts; and
   performing the natural language processing technique to calculate the content similarity score of the text of each social media post based on the set of keywords.

4. The computer-implemented method of claim 3, wherein identifying the related subset of social media posts comprises at least one of:
   identifying social media posts within a range of content similarity scores; and
   identifying social media posts with similar content based on the set of keywords.

5. The computer-implemented method of claim 1, wherein determining that the user account is in the coordinated network of user accounts comprises:
   adjusting the degree of confidence that the user account is in the coordinated network of user accounts; and
   determining that the adjusted degree of confidence exceeds a predetermined threshold.

6. The computer-implemented method of claim 5, wherein adjusting the degree of confidence comprises at least one of:
   calculating a likelihood that the user account is correlated to at least one other user account based on social media metadata;
   increasing the degree of confidence based on a prior correlation to the other user account;
   calculating a likelihood that the cluster of social media posts indicates coordination; and
   increasing the degree of confidence based on a prior indication of coordination.

7. The computer-implemented method of claim 1, wherein performing the security action comprises at least one of:
   flagging the social media post;
   flagging the user account;
   flagging the coordinated network of user accounts;
   alerting an administrator about the coordinated network of user accounts;
   reducing a reach of the social media post; and
   performing a remedial action on the origin of the social media post.

8. The computer-implemented method of claim 1, further comprising evaluating the origin of the social media post to identify at least one of:
   another cluster of social media posts; and
   another coordinated network of user accounts.

9. A system for detecting coordinated propagation of social media content, the system comprising:
   a calculation module, stored in memory, that calculates, using a natural language processing technique through data mining, a content similarity score for each social media post in relation to other social media posts in a set of social media posts;
   an identification module, stored in memory, that identifies a related subset of social media posts based on the content similarity score;
   a detection module, stored in memory, that detects at least one cluster of social media posts in the related subset of social media posts by clustering social media posts based on the content similarity score and a timing of each social media post;
   a determination module, stored in memory, that determines that a user account associated with a social media post in the cluster of social media posts is in a coordinated network of user accounts based on:
  determining the cluster of social media posts is associated with the coordinated network of user accounts; and
  increasing a degree of confidence that the user account is in the coordinated network of user accounts from a prior dissemination event indicating the user account is in the coordinated network of user accounts;
the determination module that further identifies an origin of the social media post in the cluster of social media posts by chronologically tracing the cluster of social media posts backward through the coordinated network of user accounts to the origin, wherein the origin comprises an entity that disseminates content to the coordinated network of user accounts;
a security module, stored in memory, that performs a security action to mitigate malicious content on the computing device in response to determining that the user account is in the coordinated network of user accounts and identifying the origin of the social media post; and
at least one processor that executes the calculation module, the identification module, the detection module, the determination module, and the security module.

10. The system of claim 9, wherein the content similarity score is weighted based on a type of the social media post.

11. The system of claim 9, wherein the calculation module calculates the content similarity score by:
  extracting text from each social media post;
  identifying a set of keywords with a degree of uniqueness for the set of social media posts; and
  performing the natural language processing technique to calculate the content similarity score of the text of each social media post based on the set of keywords.

12. The system of claim 11, wherein the identification module identifies the related subset of social media posts by at least one of:
  identifying social media posts within a range of content similarity scores; and
  identifying social media posts with similar content based on the set of keywords.

13. The system of claim 9, wherein the determination module determines that the user account is in the coordinated network of user accounts by:
  adjusting the degree of confidence that the user account is in the coordinated network of user accounts; and
  determining that the adjusted degree of confidence exceeds a predetermined threshold.

14. The system of claim 13, wherein adjusting the degree of confidence comprises at least one of:
  calculating a likelihood that the user account is correlated to at least one other user account based on social media metadata;
  increasing the degree of confidence based on a prior correlation to the other user account;
  calculating a likelihood that the cluster of social media posts indicates coordination; and
  increasing the degree of confidence based on a prior indication of coordination.

15. The system of claim 9, wherein the security module performs the security action by at least one of:
  flagging the social media post;
  flagging the user account;
  flagging the coordinated network of user accounts;
  alerting an administrator about the coordinated network of user accounts;
  reducing a reach of the social media post; and
  performing a remedial action on the origin of the social media post.

16. The system of claim 9, further comprising evaluating the origin of the social media post to identify at least one of:
  another cluster of social media posts; and
  another coordinated network of user accounts.

17. A non-transitory computer-readable medium comprising one or more computer-executable instructions that, when executed by at least one processor of a computing device, cause the computing device to:
  calculate, by the computing device using a natural language processing technique through data mining, a content similarity score for each social media post in relation to other social media posts in a set of social media posts;
  identify, by the computing device, a related subset of social media posts based on the content similarity score;
  detect, by the computing device, at least one cluster of social media posts in the related subset of social media posts by clustering social media posts based on the content similarity score and a timing of each social media post;
  determine, by the computing device, that a user account associated with a social media post in the cluster of social media posts is in a coordinated network of user accounts based on:
    determining the cluster of social media posts is associated with the coordinated network of user accounts; and
    increasing a degree of confidence that the user account is in the coordinated network of user accounts from a prior dissemination event indicating the user account is in the coordinated network of user accounts;
  identify, by the computing device, an origin of the social media post in the cluster of social media posts by chronologically tracing the cluster of social media posts backward through the coordinated network of user accounts to the origin, wherein the origin comprises an entity that disseminates content to the coordinated network of user accounts; and
  perform a security action to mitigate malicious content on the computing device in response to determining that the user account is in the coordinated network of user accounts and identifying the origin of the social media post.

18. The non-transitory computer-readable medium of claim 17, wherein the content similarity score is weighted based on a type of the social media post.

19. The non-transitory computer-readable medium of claim 17, wherein the computer-executable instructions cause the computing device to calculate the content similarity score by:
  extracting text from each social media post;
  identifying a set of keywords with a degree of uniqueness for the set of social media posts; and
  performing the natural language processing technique to calculate the content similarity score of the text of each social media post based on the set of keywords.

20. The computer-implemented method of claim 19, wherein the computer-executable instructions cause the computing device to identify the related subset of social media posts by at least one of:

identifying social media posts within a range of content similarity scores; and identifying social media posts with similar content based on the set of keywords.

* * * * *